METHOD FOR PRODUCING COMPACT MAGNETIC CORE ARRAYS

Filed Oct. 25, 1972

4 Sheets-Sheet 1

METHOD FOR PRODUCING COMPACT MAGNETIC CORE ARRAYS

Filed Oct. 25, 1972

United States Patent Office 3,837,951
Patented Sept. 24, 1974

3,837,951

METHOD FOR PRODUCING COMPACT MAGNETIC CORE ARRAYS

Niels Krag, Pacific Palisades, Calif., assignor to Electronic Memories and Magnetics Corporation, Los Angeles, Calif.

Filed Oct. 25, 1972, Ser. No. 300,790
Int. Cl. H01f *3/00, 41/02*
U.S. Cl. 156—85 10 Claims

ABSTRACT OF THE DISCLOSURE

A method for mounting small magnetic cores at close spacings, including coating a sheet of rubber with an adhesive, stretching the rubber sheet, pressing the rubber sheet against an array of magnetic cores that are held in a cavity plate at greater spacings than is desired in the final array, and separating the sheet from the cavity plate so the cores stick to the sheet. The stretched rubber sheet is then relaxed so the cores move close together, an adhesive-coated substrate is pressed against the array of cores, and the adhesive on the rubber sheet is dissolved away so the cores are held only on the substrate.

BACKGROUND OF THE INVENTION

This invention relates to a method and apparatus for mounting arrays of magnetic cores.

One type of computer memory utilizes arrays of small magnetic cores. Each array may contain many thousands of small magnetic cores arranged in rows and columns. The cores are mounted by first dropping them into cavity plates that have thousands of recesses for receiving the cores at accurately controlled positions. An adhesive-coated plate, or substrate, is then pressed against the projecting portions of the cores and then moved away from the cavity plate with the cores embedded in the adhesive on the substrate. In many applications, it is desirable to mount the cores at very close spacings. However, this has required close spacings of the recesses in the cavity plate, which left very narrow webs between adjacent recesses. For example, cores that are 0.018 inches in outside diameter may be arranged so that the corners of some adjacent cores are spaced by 0.001 inch or less. The very thin webs left between adjacent recesses can lead to short life for the cavity plates. One method that has been used for mounting cores at close centers involves the use of cavity plates with shallow recesses, so that only a small edge portion of each core is held in a recess, so there are wider webs left between the recesses. However, this increases the time required to load the cores into the cavity plate and results in less accurate positioning of the cores on the substrate. A core mounting method which was relatively simple and which permitted the economical and accurate mounting of magnetic cores at close spacings would reduce the cost of compact magnetic memories.

SUMMARY OF THE INVENTION

In accordance with one embodiment of the present invention, an economical method is provided for mounting an array of small magnetic cores at very close but accurately controlled spacings on a substrate. The method involves the use of a stretched elastic sheet which picks up the cores from a cavity plate, the sheet then being relaxed so that the cores move close together. Prior to stretching the elastic sheet it is coated with a thin layer which is soluble in water or other solvent. The sheet is then accurately stretched in a frame and pressed against the projecting portions of cores that have been located in a cavity plate. The elastic sheet is then separated from the cavity plate with the cores remaining on the elastic sheet, and the elastic sheet is relaxed to an almost or completely unstretched state so the cores move close together. A substrate with uncured adhesive thereon is pressed against the array of cores on the relaxed elastic sheet, and the adhesive is allowed to cure. The array of cores with a substrate on one side and an elastic sheet on the other is then immersed in water or other solvent that dissolves only the adhesive on the elastic sheet.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figures 1, 2, 3, 4:
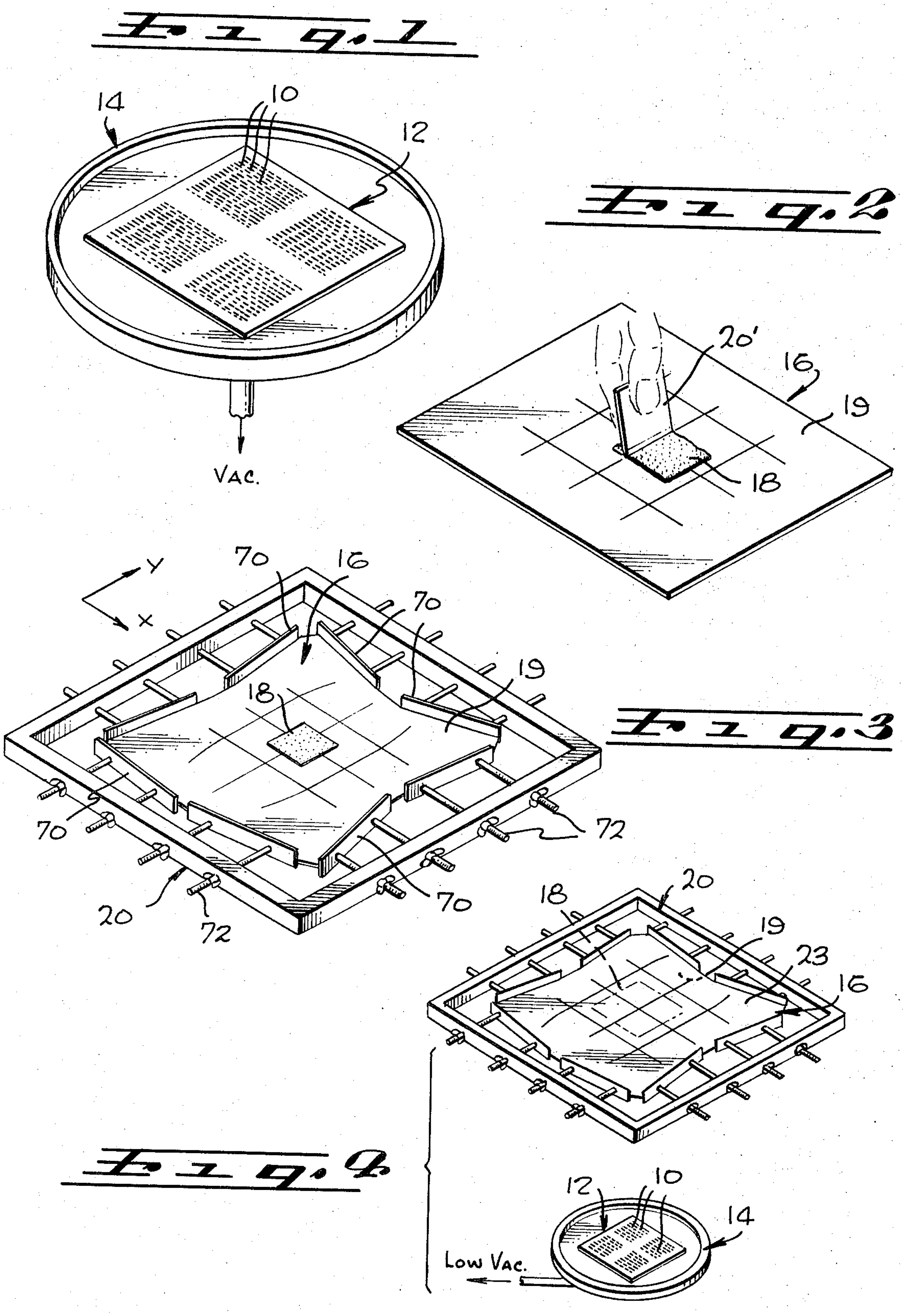
FIG. 1 is a perspective view of a cavity plate locating apparatus, showing a first step of the invention.
FIG. 2 illustrates the coating on an elastic sheet in accordance with a second step of the invention.
FIG. 3 illustrates a stretching frame for stretching the sheet of FIG. 2 in accordance with a third step of the invention.
FIG. 4 illustrates the manner in which the stretched sheet of FIG. 3 is brought against the cavity plate of FIG. 1, in accordance with a fourth step of the invention.

FIGS. 1–8 illustrate the method by which an array of magnetic cores is mounted at close spacings on a substrate. FIG. 1 illustrates a first step of the method which includes dropping the magnetic cores 10 into the recesses of cavity plate 12 that is held on a cavity plate holder 14.

FIG. 2 illustrates a first step in the preparation of an elastic sheet 16 which will pick up the magnetic cores from the cavity plate. A layer of adhesive 18 which is soluble in water or other solvent is spread with a blade 20' over a center portion of the elastic sheet 16 on a front face 19 thereof, so that the magnetic cores will stick to the elastic sheet. FIG. 3 illustrates the manner in which the elastic sheet 16 with the layer of adhesive thereon is stretched in a frame 20. Stretching occurs primarily in the X direction because the reduction in spacing of the cores is desired only in that direction in this particular apparatus. However, some stretching is also performed in a perpendicular Y direction in order to compensate for shrinkage or "necking" which would otherwise occur in a direction perpendicular to the major direction of stretching.

Figures 5, 6, 7, 8:
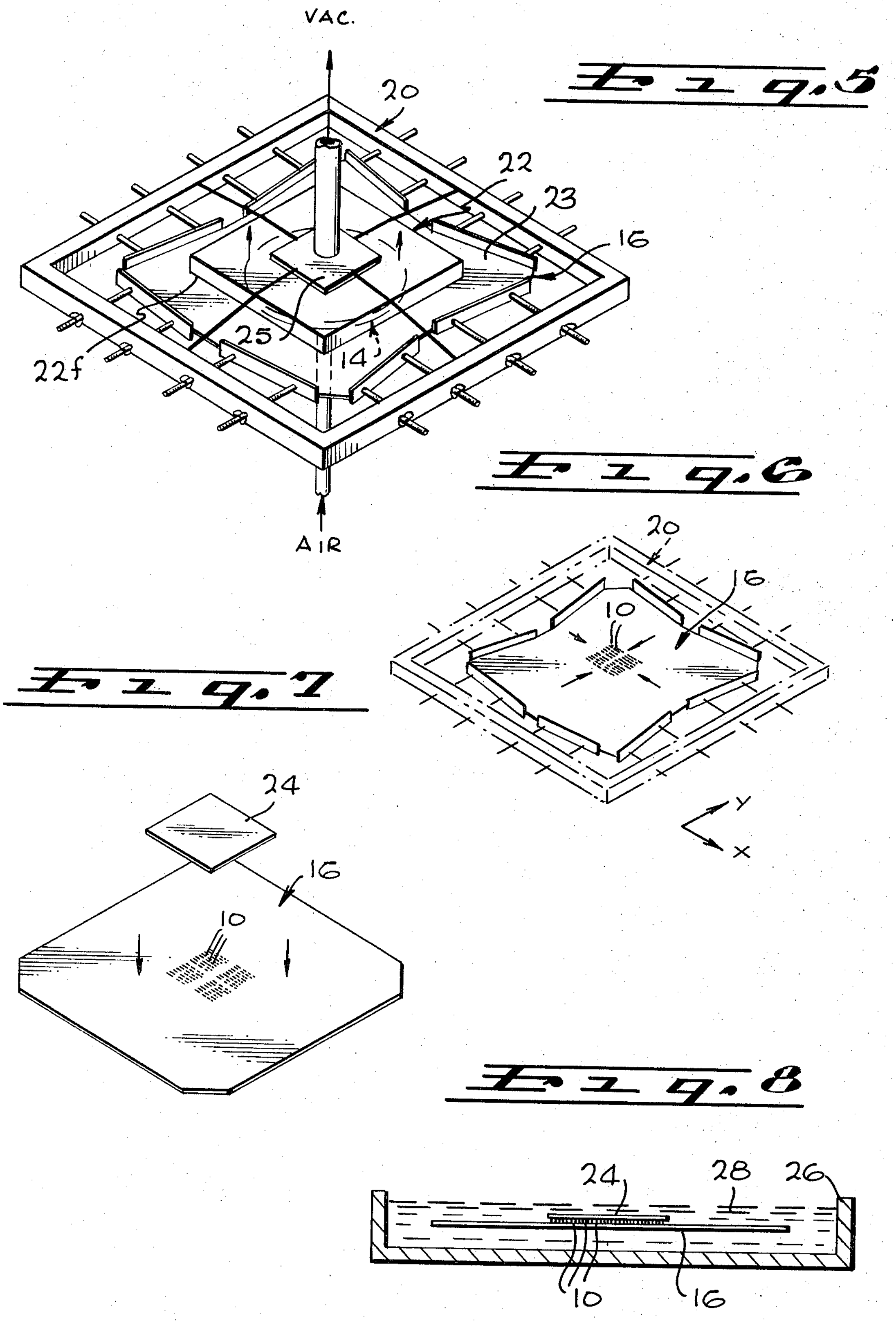
FIG. 5 illustrates the apparatus of FIG. 4 and a vacuum chuck applied to the elastic sheet thereof in accordance with a fifth step of the invention.
FIG. 6 illustrates how the elastic sheet of FIG. 5 is relaxed, in accordance with a sixth step of the invention.
FIG. 7 illustrates the method in which a substrate is applied to the array on the sheet of FIG. 6, in accordance with a seventh step of the invention.
FIG. 8 illustrates the sheet-array-substrate sandwich of FIG. 7 immersed in a tank of water, in accordance with an eighth step of the invention.

FIG. 4 illustrates a next step in the process of the invention, in which the stretched sheet 16 is laid against the cavity plate 12 so that the front face 19 of the sheet which bears the layer of adhesive 18 presses against the cores 10 that are held in the cavity plate. FIG. 5 illustrates the application of a vacuum chuck 22 with a flat face **22*f* to the rear face 23 of the elastic sheet, and the lifting of the sheet so that it and the magneic cores attached thereto are lifted off the cavity plate. An auxiliary connector 25 connects the chuck 22 to the frame 20 so the frame is lifted with the sheet. FIG. 6 illustrates how the elastic sheet 16 with the cores 10** thereon is relaxed. The relaxation may be only partial, but is complete in this case to permit removal of the elastic sheet from the frame. This relaxation causes the magnetic cores to move closer together along the X direction so that a compact array is obtained. The array then must be transferred to a substrate which can securely hold the cores in use.

FIG. 7 illustrates a next step in the process wherein an adhesive-coated substrate or core holder 24 is laid on the relaxed elastic sheet 16 (which has been removed from the frame), over the array of cores 10 that are on the sheet. The cores are thus embedded on opposite side, respectively in adhesive on the elastic sheet 16 and in adhesive on the substrate. FIG. 8 illustrates the next step wherein the assembly which includes the cores 10 sandwiched between the elastic sheet 16 and the substrate 24, is immersed in a tank 26 that is filled with water 28. The water dissolves the adhesive on the elastic sheet 16 so it is released from the cores 10. The adhesive on the substrate 24, which may lie on a tape attached to the substrate, is a room temperature vulcanizing type which is not dissolved in water. The cores 10 are therefore attached only to the substrate 24. In the prior art, the array of cores were transferred to the substrate 24 directly from the cavity plate 12. The product constructed in accordance with the present invention is similar, except that the cores are closer together than they would be if directly transferred from the cavity plate 12 to the substrate.

The compacting process can be facilitated by performing several of the steps in a particular way. The application of a layer of adhesive 18 to the elastic sheet can be performed by utilizing silk screening techniques to provide a thin uniform layer of adhesive. It is possible to apply the adhesive to the elastic sheet after it is stretched instead of before, but this has been found to create problems. Where adhesive was applied to already stretched sheets. it was found that when the sheet was relaxed the adhesive did not move as uniformly, and this caused some of the cores to be shifted out of position. The mounting of the cores in the cavity plate is generally accomplished by maintaining a vacuum on the cavity plate as the plate is vibrated and while a load of cores lies on the plate. The vacuum is maintained, though at a lower level, as the stretched elastic sheet is lowered against the cavity plate. This reduces the possibility that cores may fly out of the plate if the elastic sheet has picked up any static electricity. Prior to moving the sheet against the cavity plate, wax paper is attached to the cavity plate around the core array, so that the elastic sheet does not stick to the cavity plate. After the streched elastic sheet reaches the cores, the sheet is massaged to assure that all cores are firmly embedded in the layer of adhesive on the sheet. When the vacuum chuck 22 is applied to the rear face of the elastic sheet, as illustrated in FIG. 5, air can be blown through the cavity plate to help dislodge the cores therefrom and assure that they will all stick to the elastic sheet. In order to enable better exit of all cores, the positive air pressure is pulsated.

Figure 9:
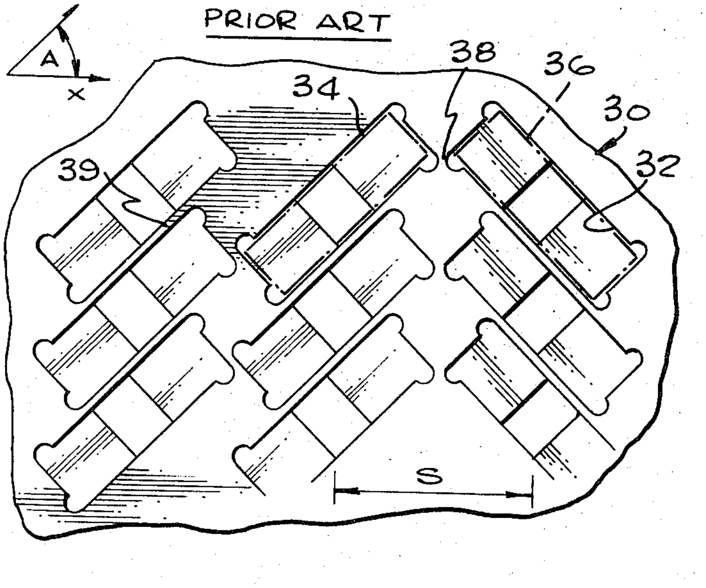
FIG. 9 is a highly enlarged plan view of a cavity plate constructed in accordance with the prior art, illustrating the thin webs left between adjacent recesses.
Figure 11:
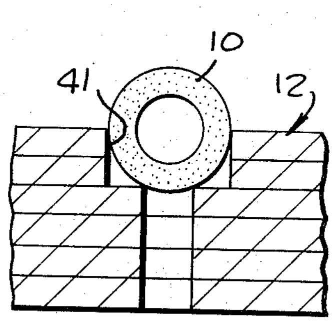
FIG. 11 is an enlarged sectional view of a cavity plate in accordance with the invention.

FIG. 9 illustrates a portion of the cavity plate 30 of the prior art, in which the recesses 32 of the cavity plate were formed close together. The particular orientation of the cavities 32 is shown for an application where the cores, such as cores 34 and 36 are oriented at an angle A such as 45° from the direction X in which the rows of cores extend. The close spacing of the recesses or cavities 32 is provided so that the column of cores are close together and therefore the array is relatively compact. However, the close spacings of the columns of cavities results in very thin and short webs 38 and 39 lying between some cavities. In some applications where cores of a diameter of 0.018 inches are employed, the webs 38 and 39 may be 0.001 inch or less. The thin but short webs create regions of the cavity plates that are easily damaged. The cavity plates are generally constructed of several thin sheets that are bonded together, and delamination is likely to occur where there are short and thin webs in the plates. In the cavity plates of the present invention, the recesses 32 may have the same shape and arrangement as illustrated in FIG. 9, but the spacing S between the centers of the columns of recesses is increased, thereby increasing the width of the webs at 38 and 39. The manner in which each core is held in a cavity remains the same as in the prior art, and this is indicated in FIG. 11 which shows a core 10 securely nested in a cavity 41 of the plate 12.

Figure 10:
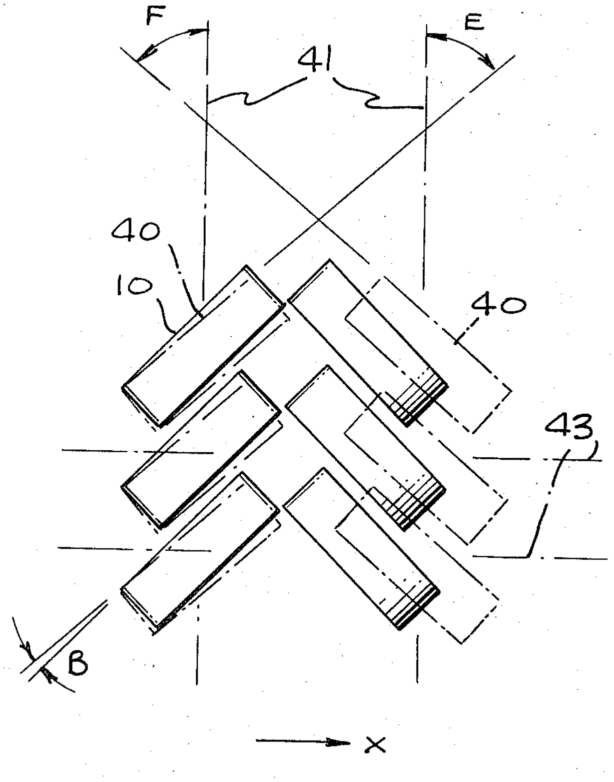
FIG. 10 illustrates a portion of a core array, showing how the positions of the cores can change in accordance with the invention, for an array which is compacted in only one direction.

FIG. 10 illustrates how cores 10 are arranged in an array of the present invention after being compacted by the relaxing of a previously stretched elastic sheet on which they were mounted. The figure also illustrates in phantom lines the positions 40 of the cores prior to relaxing of the elastic sheet, these being the positions of the cavities of the cavity plate of the invention. In the array of FIG. 10, compaction has occurred only in the X direction, to bring columns of cores together, but without changing the spacing of the rows of cores. It should be noted that the cores are rotated by a small angle B during the compacting process, where compacting occurs only in one direction. Where the distances between the centers of the cores are decreased by about 30%, and the cores in the finished array are to be oriented at about 45° from the direction of compaction, a rotation of an angle B on the order of ten degrees occurs from an initial orientation of about 35° from the direction of compaction. The cavity plate 12 which initially positions the array of cores is constructed so that after the rotation resulting from compaction, the cores will be oriented in the desired directions. The cavity plate has elongated recesses at the positions 40 arranged in columns extending along the lines 41 and in rows extending along the lines 43. The lengths of the recesses in a pair of adjacent columns are oriented at opposite angles E and F from the directions of the columns so that the corners of some recesses are close together. However, the corners are still further apart than in the desired final array.

Figure 12:
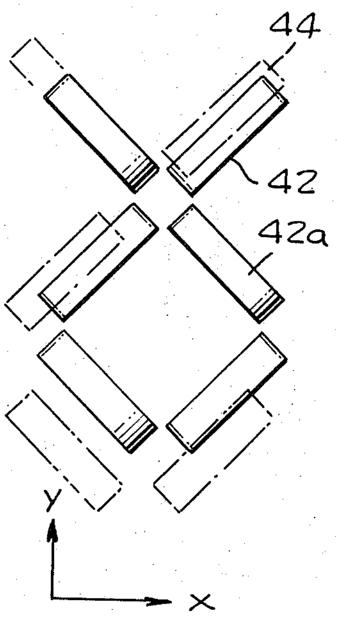
FIG. 12 is an enlarged plan view of a portion of a core array, showing the changes of core positions for an array compacted in two perpendicular directions in accordance with the invention.

FIG. 12 illustrates another core array configuration wherein the cores 42 are in a "box" arrangement, in which the corners of some cores are close to cores in the same column as well as cores in the same row. In order to increase the separation of the cores at their corners, and thereby eliminate short and thin webs in the cavity plate, the array is constructed by initially stretching the elastic sheet in two perpendicular directions X and Y. The positions which the cores 42 assumed in the cavity plate and on the elastic sheet prior to relaxation of the sheet, are indicated in phantom lines at 44 in FIG. 12. The positions 44 are indicated relative to one of the cores **42*a***. It can be seen that the cores shift position but theoretically do not rotate, when compacted to the same extent in two perpendicular directions.

Figure 13:
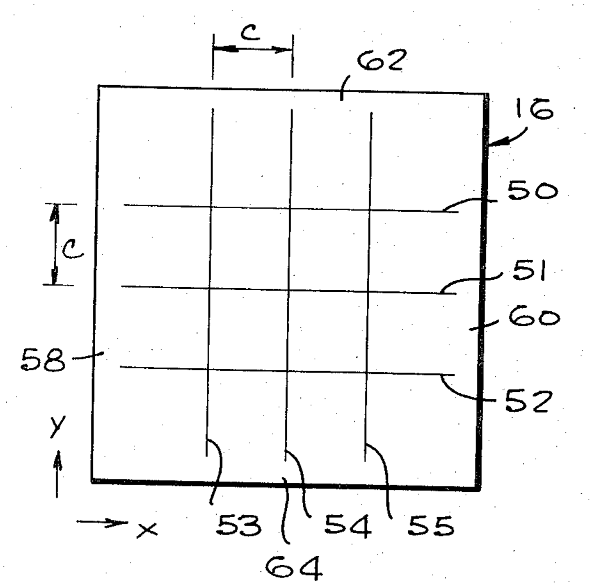
FIG. 13 is a plan view of a portion of the elastic sheet of FIG. 2 shown prior to stretching.
Figure 14:
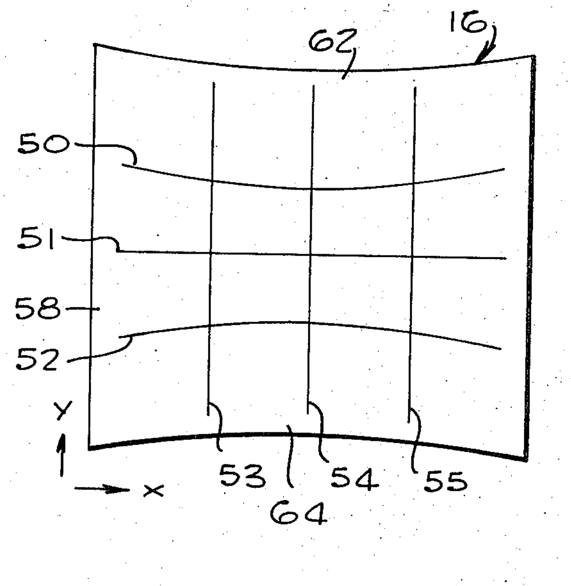
FIG. 14 is a plan view of the sheet of FIG. 13 after stretching in one direction.
Figure 15:
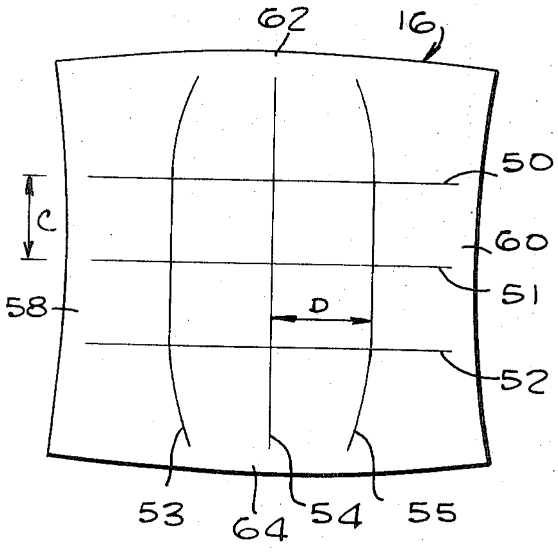
FIG. 15 is a plan view of the sheet of FIG. 14 after stretching in perpendicular directions in an amount which results in uniform elongation in one direction and elimination of contraction in the perpendicular direction.

The elastic sheet 16 can be constructed of a variety of materials such as natural rubber. It is generally desirable to use a sheet which is much longer and wider than the array of cores to be compacted by it. This is because it is difficult to closely control stretching in all directions over a large proportion of the area of a sheet. FIG. 13 illustrates the sheet 16 prior to the stretching of it. Three lines 50, 51, and 52 which extend in the X direction, and three lines 53, 54, and 55 which extend in the Y direction, are printed on a surface of the sheet. Each line is spaced the same distance C from an adjacent line extending in the same direction, and the lines are initially straight. FIG. 14 illustrates the sheet 16 after it has been stretched in the X direction by separation of opposite edge portions 48, 60. It can be seen that the edges 62 and 64 of the material contracts in a direction perpendicular to the direction of stretching. If a rectangular array of cores were transferred to the sheet in the condition shown in FIG. 14, and the sheet were then allowed to relax, then the rows of cores which originally extended in straight lines would not extend in straight lines. In most applications it is desirable to have the cores extend in straight lines to facilitate stringing of wires through them. In order to prevent curving of the rows, stretching is performed in two perpendicular directions to achieve the sheet configuration illustrated in FIG. 15. In FIG 15, the opposite edge portions 62, 64 are also stretched in a controlled manner to compensate for the tendency of the sheet to contract, and some adjustments are also made in stretching between the edge portions 58, 60. Stretching is controlled so that the spacing between the lines 50, 51, and 52 is at the same distance C as in the relaxed sheet, while the spacing D between the perpendicular lines 53, 54, and 55 is at a predetermined distance which may be, for example, 30° more than C. Generally, it is not difficult t retain a rectangular grid configuration of the lines 50–55 at the center portion of the sheet, but it is difficult to maintain it rectangular near the edges. Thus, a large sheet is used so that a center portion which is easily closely controlled in stretching is available to receive the core array. The lines 50–55 are printed on the sheet to enable an operator to control stretching. The operator generally adjusts stretching so that the lines are straight along the four rectangles formed by the lines at the center of the sheet. This assures that perpendicular imaginary lines on the sheet that were straight prior to stretching will remain straight after stretching.

Figure 16:
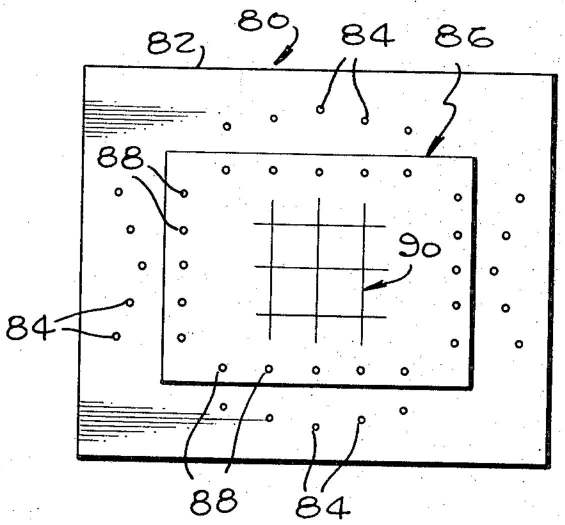
FIG. 16 is a simplified plan view of a stretching frame and elastic sheet constructed in accordance with another embodiment of the invention.

The control of stretching can be accomplished in a number of ways. The frame 20, best illustrated in FIG. 3, includes two clamps 70 along each of four rectangular edge portions of the sheet. Each clamp holds an elongated region of an edge portion of the sheet. Each clamp is held by a pair of screws 72, so that each clamp can be moved in and out and also can be tilted. This control of eight clamps permits relatively close control of sheet stretching so that an imaginary rectangular grid on the sheet remains rectangular after stretching. Another stretching device is illustrated in FIG. 16. This stretching device 80 includes a platform 82 having numerous pins 84. An elastic sheet 86 has numerous eyelets over a corresponding pin 84. The positions of the pins 84 and eyelets 88 have been chosen so that a rectangular grid 90, whether actually imprinted or imaginary, remains rectangular after stretching, and so that there are predetermined changes in spacings of the grid lines in each of the two perpendicular directions.

While stretching may be performed in two orthogonal directions so that a grid that is rectangular prior to stretching is rectangular after stretching, this is not always necessary. It is possible to stretch the sheets so that an originally rectangular grid is not rectangular after stretching. However, if the final array of cores is to be rectangular, it is then necessary to construct the cavity plate so that it initially positions the cores along a non-rectangular imaginary grid. In most cases, the final core array should be rectangular, because this aids in the stringing of wires through the cores, but there can be applications where the final array is not rectangular. In addition to stretching in perpendicular directions, it is possible to stretch in a polar manner, as by stretching an elastic sheet uniformly over a hoop. Again, this is possible so long as the cavity plate is constructed so that after the cores are transferred to the sheet and it is relaxed, the cores will be in the desired final positions. Of course, relaxation of the elastic sheet does not have to be to a completely unstretched state, and in fact it is generally desirable that some slight tautness of the sheet be maintained during transfer of the cores to the final substrate.

In addition to the use of stretched elastic sheet for compacting the core arrays, it is possible to utilize shrinkable sheets. Materials are known which will shrink, as when subjected to heat or moisture. However, it is generally more difficult to accurately control contraction in such materials than in the case of a previously stretched elastic sheet.

Thus, the invention provides a relatively simple method and apparatus for compacting an array of cores. The method includes the stretching of an elastic member, which is generally a sheet of elastic material, attaching an array of cores to the stretched member, relaxing the stretched member at least partially to compact the array, and transferring the cores from the elastic member to a holder which may be the final substrate upon which the cores are mounted. The cores are generally first mounted on a cavity plate and transferred therefrom to the stretched elastic sheet, although it is possible to initially position the cores directly on the elastic sheet. In the production of rectangular arrays of cores, the sheet is genenerally stretched in two perpendicular directions. In that case, stretching is generally closely controlled so that an imaginary array of straight perpendicular lines on the relaxed or only slightly stretched sheet is perpendicular after stretching of the sheet.

Although particular embodiments of the invention have been described in illustrated herein, it is recognized that modifications and variations may readily occur to those skilled in the art and consequently it is intended that the claims be interpreted to cover such modifications and equivalents.

What is claimed is:

1. A method for producing compact magnetic core arrays comprising:

stretching an elastic member;

attaching an array of cores to said elastic member after it is stretched;

relaxing said elastic member at least partially, after the array of cores has been attached thereto; and transferring said cores from the elastic member to a holder after the elastic member has been relaxed at least partially.

2. The method described in Claim 1 including:

applying an adhesive layer to said elastic member at a time before stretching of the elastic member to the configuration it has when the array of cores is attached thereto; and said step of attaching includes embedding the cores in said adhesive layer.

3. The method described in Claim 1 wherein:

said step of stretching includes separating locations along first and second opposite edge portions, and also separating locations along third and fourth opposite edge portions in a controlled manner, so that a first pair of imaginary lines that are straight and parallel prior to stretching are straight and parallel after stretching but are spaced apart by a greater distance after stretching, and so that a second pair of imaginary spaced lines that are straight and parallel to each other and perpendicular to said first lines prior to stretching are straight and parallel to each other and perpendicular to said first lines after stretching.

4. The method described in Claim 3 wherein:

said step of stretching is controlled so that said second lines are spaced the same distance apart before and after stretching.

5. The method described in Claim 1 wherein:

said elastic member is a sheet; and said step of stretching comprises clamping the sheet along a first pair of opposite edge portions to stretch the sheet in a first predetermined X direction and clamping the sheet along a second pair of opposite edge portions to stretch the sheet in a second predetermined Y direction which is substantially perpendicular to said X direction, including applying at least two independently moveable clamps along each edge portion wherein each clamp holds an elongated region of the edge portion.

6. A method for constructing a final array of magnetic cores with the cores arranged in perpendicular rows and columns and with the cores in some adjacent columns oriented with their lengths at predetermined opposite angles on the order of 45° from the directions of the columns so that corners of the cores are close together, comprising:

positioning said cores in a cavity plate that has elongated recesses arranged in perpendicular rows and columns and with the length of at least some of the recesses in some adjacent columns oriented at predetermined opposite angles of less than 90° from the direction of the columns so that corners of the recesses in some adjacent columns are close together, but at distances greater than in the desired final array;

applying a layer of adhesive to a center portion of a sheet of elastic material;

stretching the sheet of elastic material in perpendicular row and column directions so that perpendicular imaginary straight row and column lines extending parallel respectively to said row and column directions and in said center portion of the sheet remain straight and perpendicular after said stretching, the stretching in the row direction being in an amount that increases the separation of the imaginary column lines;

laying said center portion of said sheet against the cores in said cavity plate, with said imaginary row and column lines parallel respectively to said rows and column of cores in the cavity plate;

separating said elastic sheet from said cavity plate while retaining the cores on said elastic sheet so they move out of the cavity plate;

relaxing said elastic sheet at least partially;

laying a core holder against said elastic sheet so the cores become embedded therein; and removing said elastaic sheet from the cores.

7. The method described in Claim 6 wherein:

said step of laying the sheet against the cores in the cavity plate includes maintaining a vacuum at a side of the plate opposite the cores while the sheet approaches the cores; and said step of separating the sheet from the cavity plate includes applying a vacuum chuck with a flat face to a face of the sheet opposite the cores, and then applying a vacuum to the chuck and separating the sheet from the cavity plate.

8. The method described in Claim 6 wherein:

said step of positioning the cores in a cavity plate comprises positioning them in a cavity plate in which the recesses oriented at predetermined angles from the column directions are oriented at greater angles from a direction in line with their respective columns than the desired orientation of the cores in the final array.

9. A method for producing compact magnetic core arrays, comprising:

attaching an array of cores to a sheet of material which can shrink in at least one direction along the plane of the sheet, said cores being attached to the sheet so that portions of the cores project from the sheet;

shrinking the sheet with the cores attached thereto;

attaching the projecting portions of the cores to a holder; and removing said sheet of shrinkable material from said cores.

10. The method described in Claim 9 wherein:

said sheet of shrinkable material is constructed of elastic material and said sheet is stretched prior to attaching said cores thereto.

References Cited

UNITED STATES PATENTS

| | | | |
|---|---|---|---|
| 3,574,927 | 4/1971 | Whetstone | 29—604 X |
| 3,739,466 | 6/1973 | Schoettle | 29—604 |
| 3,768,155 | 10/1973 | Bonfiglio et al. | 29—604 |

WILLIAM A. POWELL, Primary Examiner

U.S. Cl. X.R.

29—203 MM, 424, 604; 156—229, 235, 247, 285, 299, 540